United States Patent

[11] 3,584,838

| [72] | Inventor | Herbert C. Tampin |
| | | Gravesend, Kent, England |
| [21] | Appl. No. | 799,859 |
| [22] | Filed | Feb. 17, 1969 |
| [45] | Patented | June 15, 1971 |
| [73] | Assignee | Electrohoists Patents Limited |
| | | Gravesend, Kent, England |
| [32] | Priority | Feb. 20, 1968 |
| [33] | | Great Britain |
| [31] | | 8241/68 |

[54] ROOF HOISTS
10 Claims, 16 Drawing Figs.

[52] U.S. Cl................................................ 254/183, 254/142
[51] Int. Cl.............................................. B66d 1/26
[50] Field of Search........................................ 254/142, 183, 184; 212/8; 188/171, 173

[56] References Cited
UNITED STATES PATENTS

| 881,772 | 3/1908 | Canney................ | 254/184 |
| 1,093,656 | 4/1914 | Sidwell................ | 212/8 |
| 1,148,323 | 7/1915 | Kendall................ | 254/184 |
| 1,282,483 | 10/1918 | Steen................ | 188/171 |

FOREIGN PATENTS

| 250,820 | 4/1964 | Australia................ | 254/183 |

Primary Examiner—Evon C. Blunk
Assistant Examiner—Alfred N. Goodman
Attorney—Larson, Taylor & Hinds ABSTRACT: A portable hoist capable of being moved from location to location with but little dismantling and comprising a simple frame with two cable drums geared together, two electric motors allocated respectively to the cable drums for winding and unwinding the cables, and two brake mechanisms, one for each cable drum, arranged automatically to stop the drums when the power supply to the motors is interrupted. There are two detachable jibs for carrying the cables over, for example, the edge of a tall building. There is also a portable control box arranged to be connected to any convenient source of electrical power and containing the switchgear necessary for the motors and brake mechanisms. Remote control may be effected by an electrical controller manually actuable in a cradle supported by the hoist. The hoist may be divided into two units, each with one drum, one motor, one brake mechanism and one jib.

ROOF HOISTS

This invention relates to portable hoists for use for example, on the tops of tall buildings for raising or lowering cradles or cages to enable their occupants to clean windows or repair or decorate the facades of the building. Such hoists may also be used for many other purposes as for example in building construction and in painting ships, ship construction and warehousing.

A primary object of the invention is to provide an improved portable roof hoist, that is to say, an improved hoist that can, with but little dismantling, be readily removed from one location such as a roof, if necessary with the aid of a trolley, and taken to another location, such as another roof, for further use. A further object is to provide a roof hoist that is particularly safe in operation, when used for raising and lowering a workman's cradle, both in regard to the stability it provides for the cradle and in the arrangement of its driving and braking mechanism. Yet another object of the invention is to provide a hoist that can equally easily be moved from point to point over short distances as between widely separated locations.

According to the invention, a portable roof hoist arranged to be moved readily from location to location without the necessity for any special carrying equipment and after little or no dismantling of the hoist, includes a frame, two cable drums, each mounted to rotate about its axis on said frame, means interconnecting said drums whereby the rotation of one causes the other to rotate, two electric motors allocated respectively to said drums, two brake mechanisms allocated respectively to said drums, electrical means for maintaining said brake mechanisms in their brake-releasing condition and mechanical means for causing said brake mechanisms to brake said drums when said electrical means are ineffective. Generally it is also necessary to provide the hoist with two detachable jibs, upon which the frame is removably mounted, having sheaves at their outer ends over which the cables from said drums travel. While it is possible to mount the drums coaxially, it is generally preferable to mount them with their axes parallel.

Very conveniently the frame may be arranged to be divided into two parts constituting a self-contained hoist or winch including one of the drums, one of the motors, one of the brake mechanisms and electrical and mechanical means for controlling the brake mechanism.

To render the hoist more readily portable, the drums or the like, with the cables wound thereon, may conveniently be made detachable.

In order that the invention may be clearly understood and readily carried into effect hoists in accordance therewith will now be described, by way of example, with reference to the accompanying drawings, in which:

FIGS. 15 and 16 are diagrammatic elevations showing further ways in which the hoists of the invention can be used.

FIGS. 1 to 4 shows the hoist in its assembled condition and mounted for use with two jibs 1, 2 resting on a coping or parapet 3 at the edge of the roof of a tall building. For a higher parapet the hoist is inclined upwards and for a very high wall the hoist may be mounted on a portable framework. The jibs 1, 2 project from a frame 4 described in greater detail below to which they are detachably secured by quick release pins 5. The jibs are manufactured from rectangular section high tensile steel tubing and have sheaves 6, 7 mounted at their outer ends. Each jib extends about 7 feet, 6 inches from the front of the frame 4 and they diverge so as to provide an approximately 6 feet, 6 inches separation between the front edges of the sheaves, thereby imparting reasonable stability to a cradle 8 (shown diagrammatically in FIG. 1) suspended in front of the building on cables 9, 10 passing over the sheaves 6, 7. These cables, extend parallel to the jibs, (as viewed in plan) from drums 11, 12 mounted on splined shafts 13, 14. The drums are held against any substantial axial movement by pins (not shown) that pass through the shafts 13, 14 and can be withdrawn to enable the drums to be removed. The shafts project upwards from bearings 16, 17 (FIG. 4) fixed to the frame 4, and they carry gearwheels 18, 19 in mesh with one another so that the drums are forced to rotate at equal speeds in opposite directions.

Figure 5:
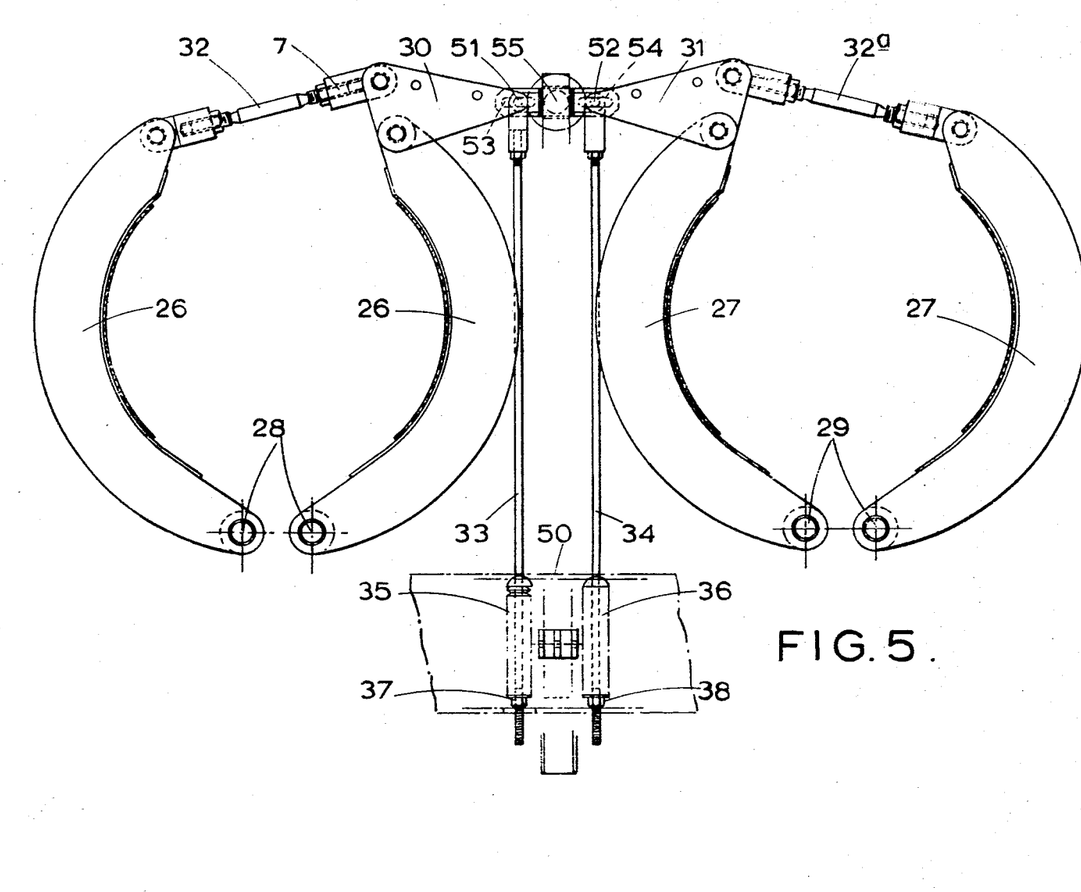
FIG. 5 is a plan showing some mechanical details of the hoist of FIGS. 1 to 4.

The gearwheels 18, 19 are in mesh respectively with gears 20, 21 on the shafts of reversible half horse power, alternating current induction motors 22, 23. Normally these motors operate together but the gearing is such that, if one fails, the other can still be used to raise the cradle 8. Beneath the gearwheels 18, 19 are brake drums 24, 25, each associated with caliper brakeshoes 26, 27, arranged as shown in FIG. 5. The shoes in each pair are pivoted about fixed axes 28, 29 and the remote end of each inner shoe is pivoted to a lever 30 or 31 connected by a link 32 or 32a to the remote end of the outer shoe. The levers 30, 31 are connected by parallel tie rods 33, 34, passing between the drums to abutments comprising spring nests 35, 36 of Bellville spring washers.

Figure 1:
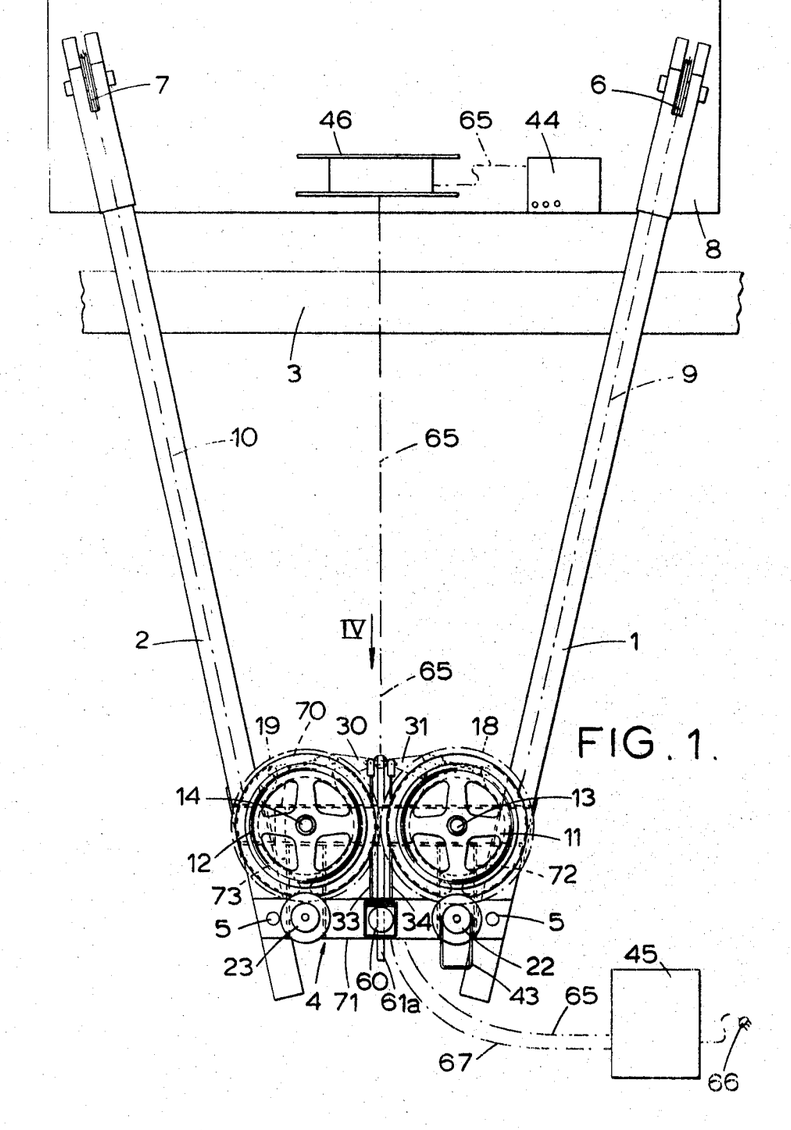
FIG. 1 is a plan of a portable hoist.

The tie rods 33, 34 pass through the nests 35, 36 to points where they carry adjustable nuts 37, 38 that bear against the adjacent ends of the spring nests while the opposite ends bear against a fixed abutment 50 forming part of the frame 4. The levers 30, 31 consist of parallel plates to which the rods 33, 34 are pivoted by fork ends carrying pins 51, 52 that pass through moving apertures in the plates as well as through slots 53, 54 in ends of a member 55 that lie between the pairs of plates. The central portion of the member 55 is constituted as a journal 56 on a bearing 57 (FIG. 6) in an arm 58 on a lever 39 pivoted to the frame 4 about an axis 40. The lever 39 is connected by a link 59 to the armature of a solenoid in a casing 60 (FIG. 1).

The arrangement is such that, so long as electrical power is available, the solenoid is energized so as to free the brakes. If the solenoid circuit is opened or if power fails, the energy stored in the spring nests 35, 36 applies tension to the tie rods 33, 34 so as to turn the levers 30, 31 in the directions necessary to cause the brakeshoes to grip the drums 24, 25. When the brakes have been applied in this manner, they may be released manually by an extension 61 of the lever 39, or by a more conveniently situated lever connected to the extension 61 by a link 62.

In addition to the two aforesaid brakes there is a third brake in the form of a disc brake on the shaft of the motor 22. This brake may be operated by remote electrical control during the ordinary operation of the hoist. However, when it is desired to raise or lower the cradle 8 by manual control, by turning a crank handle 42 (FIG. 3) on the shaft of the motor 22, the disc brake may be controlled by a lever 43.

The frame 4 consists essentially of steel tubular members of rectangular cross section, welded together, and comprises two transverse members 70, 71 joined by two members 72, 73 at right angles thereto. The axes of the members 70, 72, 73 lie in one flat plane but the member 71 is mounted on top of the rear ends of the members 72, 73. L-shaped members 74, 75 are fixed beneath the transverse member 71 and the horizontal portions of these support the tail ends of the jibs 1, 2. The inside faces of the jibs 1, 2 are recessed so as neatly to abut against the outside faces of the frame members 72, 73. The pins 5 pass through registering apertures in the member 71, the jibs 1, 2 and the members 74, 75. Further forward the jibs 1, 2 support the frame by engaging reduced ends 76, 77 (FIG. 4) of the forward transverse member 70. The top surfaces of the jibs are recessed so as neatly to engage the ends 76, 77. A removable sheet metal cover (not shown) is provided to cover the edges of the gearwheels 18, 19, this cover being provided with large apertures through which the drums 11, 12 project.

This example may be used on top of buildings one hundred to 200 feet high. The hoisting speed may be 30 feet per minute, and the safe working load, including the cradle, may be 650 lbs. When the hoist has been used at one point on the roof it may be slid along to a new operative position to enable the cradle 8 to traverse a new vertical path over the face of the building. To ease this operation, antifriction devices, such as steel balls projecting from sockets, may be provided beneath the jibs 1, 2 to rest on the parapet. Provided the overhang of the jibs, beyond the parapet 3, is small, the weight of the mechanism at the inner end of the jibs is enough to avoid all risk of the hoist toppling over the edge of the building.

The ratio between the moments on opposite sides of the parapet may be, in fact, on the average approximately 4:1, that is the ratio between the products $x.w$ and $y.p$, where $x$ is the distance from the parapet of the center of gravity of the part of the hoist inside the parapet, $w$ is the weight of the part of the hoist inside the parapet, $y$ is the distance from the parapet of the center of gravity of the load outside the parapet, and $p$ is the said load. Of course this depends on the load being kept within reasonable limits and there will be some variation with the amount of cable paid out from the drums. The weight of the unit without the cable drums and jibs is 400 lbs. The weight of each drum with its cable is 50 lbs. The weight of each jib is 120 lbs.

For additional safety, to guard against the risk of the cradle, when rising, being jammed beneath a projection on the face of the building, or against excessive wind loading, the hoist may be anchored to a fixture on the roof, such as a rail or one of a series of anchor rings, by looping cables round such a fixture and round bars 61, 62 fixed between pairs of plates 63, 64 on the jibs 1, 2.

During use, the vertical movement of the cradle is controlled by a workman on the cradle. For this purpose the cradle is provided with a press-button operated electrical controller 44 (FIG. 1) for causing the cradle to rise, descend or stop. The controller is connected by a multicore cable 65, with built in straining wire, to a portable control box 45 on the roof. As the cradle rises or descends, this cable may be wound on or paid out from a hand-actuated reeling drum 46 on the cradle 8. The control box 45 is weatherproof and is furnished with a weatherproof plug 66, for picking up the power supply from the building, and also with a cable 67, connecting it to a junction box (not shown) on the hoist. The control box contains a main power switch, a brake control relay and contactors for controlling the motors 21, 22 both for raising and lowering the cradle 8.

To enable the hoist to be carried about, the jibs and drums are removed. The drums are light enough to be carried, even with the cables wound up on them, clamps being provided for anchoring the wound cable when not in use. Each drum is grooved to ensure correct layering of the cable.

In a modification, the jibs are canted upwards with the sheaves well above the roof level or top of the parapet so that the floor of the cradle, in its highest position, is level with or very close to the roof level or the top of the parapet. This may be effected by pairs of struts attached to the jibs, the struts in each pair diverging from the jib to the roof.

Figure 2:
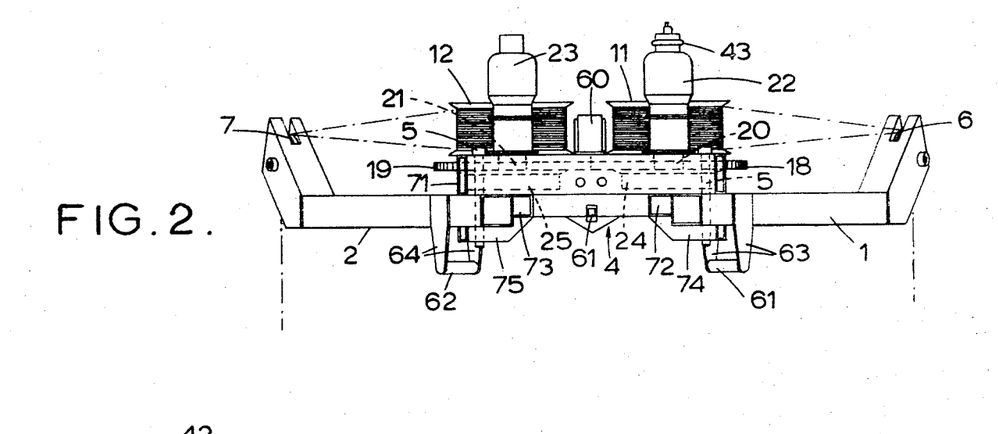
FIG. 2 is a rear elevation of the hoist of FIG. 1.
Figure 3:
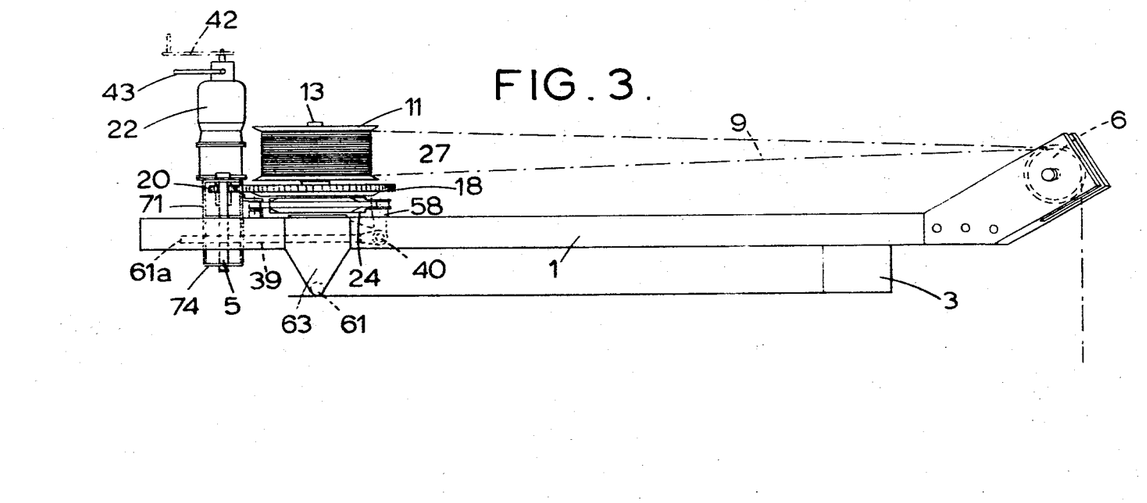
FIG. 3 is a side elevation of the hoist of FIG 1.
Figure 4:
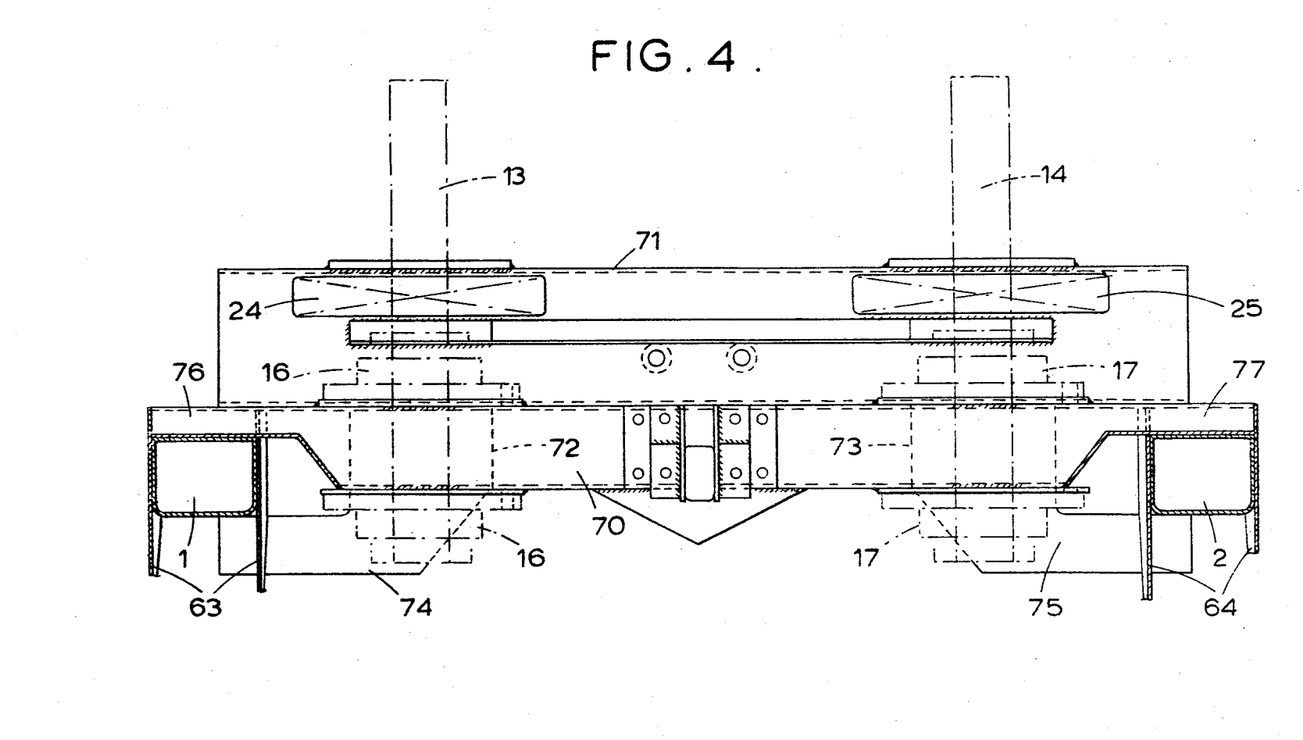
FIG. 4 is a sectional elevation of a portion of the structure of the hoist as viewed in the direction of the arrow IV in FIG. 1.
Figures 6, 8, 9:
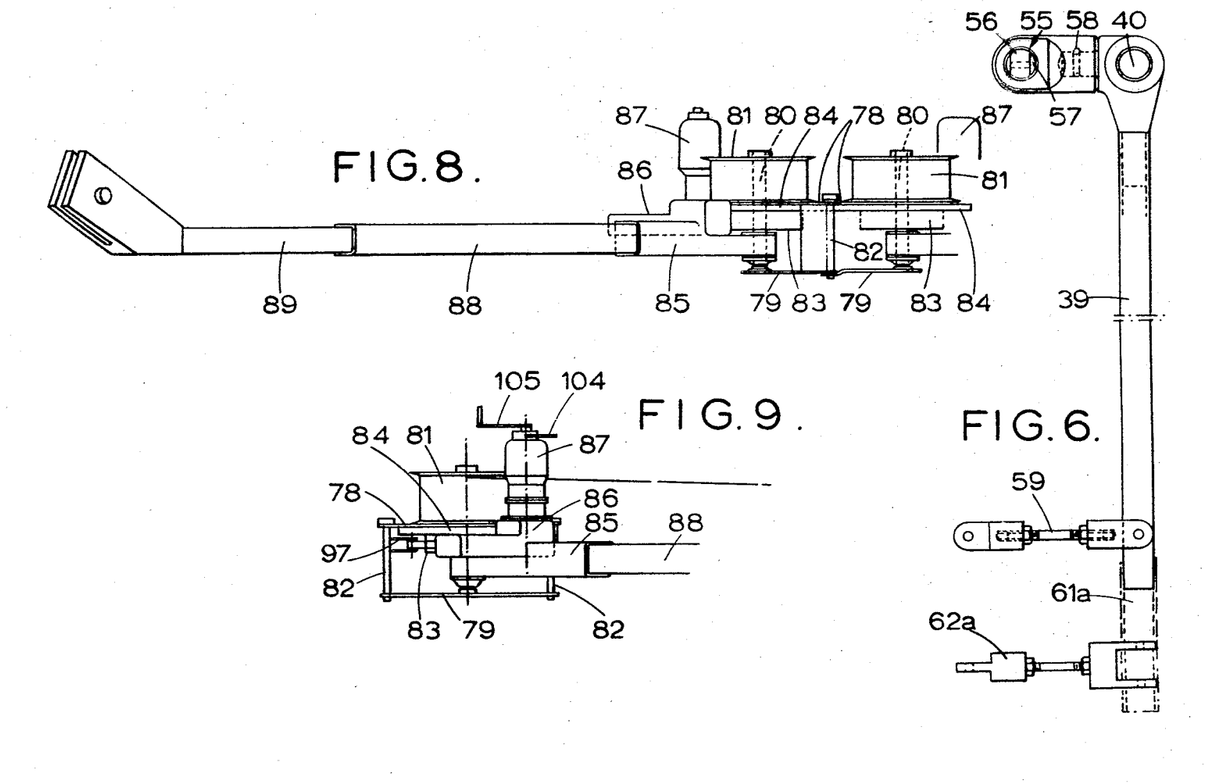
FIG. 6 is an elevation showing further mechanical details of the hoist of FIGS. 1 to 4.
FIG. 8 is a front elevation of a portion of the hoist of FIG. 7.
FIG. 9 is a side elevation showing a portion of the hoist of FIG. 7,
FIGS. 10 to 14 are diagrammatic plans showing various ways in which the hoists of the invention can be used.
Figure 7:
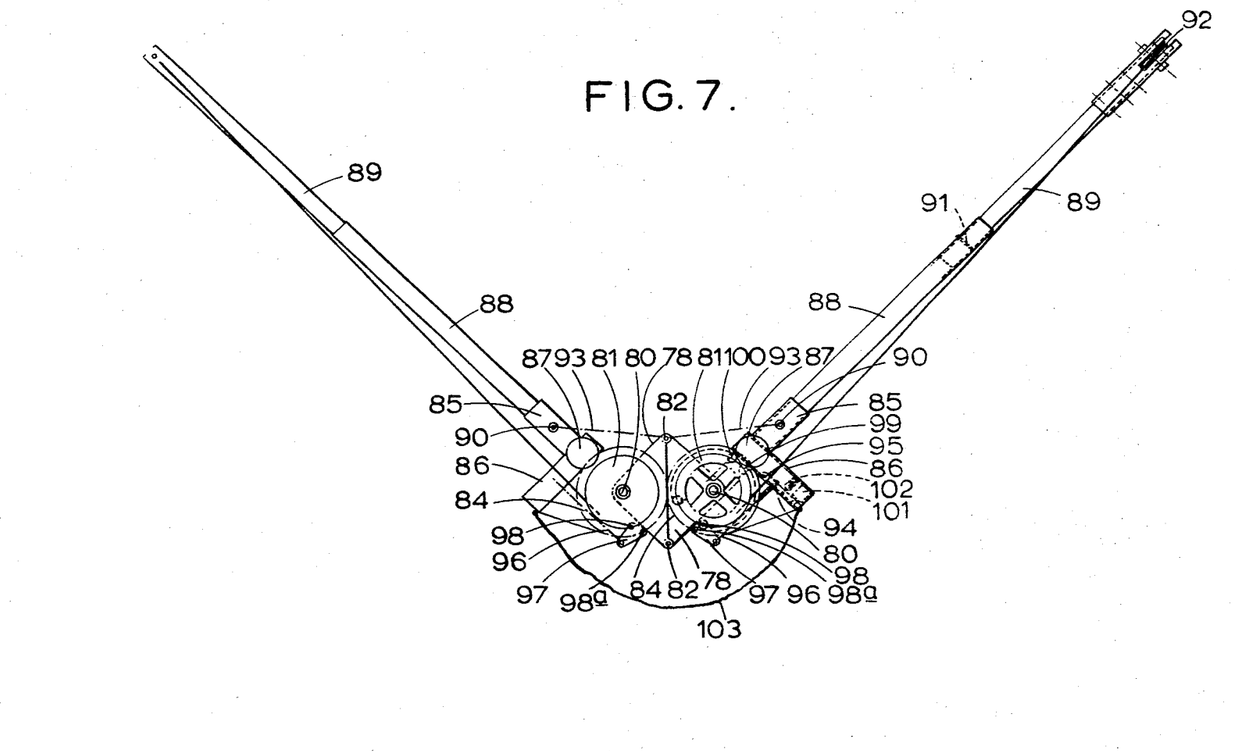
FIG. 7 is a diagrammatic plan of a second hoist.

Referring now to the modification of FIGS. 7 to 9 this incorporates the same basic features as the hoist of FIGS. 1 to 3, namely a frame, two jibs, two drums geared together and allocated respectively to the jibs, two motors for driving the drums individually, a caliper brake for each drum and electromagnetic control means for the brakes. However, in the arrangement of FIGS. 7 to 9 the hoist can be divided into two separate, self-contained hoists, each including one drum, one jib and one motor. For this reason the two brake systems are quite independent and each has its own electromagnet. FIGS. 7 to 9, which are diagrammatic, show only half of the hoist, it being understood that the other half is the mirror image of the first.

The frame comprises two upper triangular plates 78 and parallel lower triangular plates 79. Each pair of plates 78, 79 carries a spindle 80 on which the associated cable drum 81 is mounted. The two pairs of plates 78, 79 are connected by pins 82 and, when it is desired to divide the hoist into two units, it is simply necessary to remove these pins 82. Each spindle 80 carries a brake drum 83 and a gear wheel 84, the two gearwheels being in mesh with one another.

Pivoted about each spindle is a structure comprising a tubular member 85 and a box structure 86 which is at right angles thereto when viewed in plan (FIG. 7). A motor 87, geared to the associated gearwheel 84, is mounted on the box structure which contains brake-actuating mechanism as described below.

Each tubular member 85 constitutes the inner end of the jib on its respective side of the hoist, the jib comprising two further sections 88, 89. All three sections are of rectangular cross section and fit into one another end to end. Thus the section 88 at one end fits into the tubular member 85 to which it is secured by a pin 90, and at the other end receives the inner end of the section 89 to which it is secured by a pin 91. For transport the jibs are removed from the members 85 and their sections 89 separated. The sections 89 carry the sheaves 92. In order to adjust the angular position of each jib about its spindle 80, a link 93 of adjustable length is interposed between the forward pin 82 and the pin 90. This link and the equivalent link 93 on the other side enable the separation between the sheaves to be adjusted. Each link may consist of a pair of telescoping tubes formed with apertures that can be brought into register with one another in a series of predetermined positions, in each of which a locking pin may be inserted through the registering apertures in the two tubes. It will be appreciated that this adjustment will also alter the angular positions of the box structures 86 about the spindles 80. However, this involves no difficulty as it only results in the brakeshoes revolving through a small angle round the brakedrums 83, as will be appreciated from the ensuring description of the brake mechanism.

In each box structure 86 is a lever 94 pivoted to the structure 86 or 95 and connected by a tie rod 96 to a lever 97 pivoted at points 98, 98a, to brake shoes pivoted to the tubular member 85 respectively at 99, 100. In normal operation of the motors, a solenoid 101 maintains the brake in the released condition against the action of a nest of Belville springs 102. When the supply of current to the solenoid 101 fails or is cut off, springs 102 turn the lever 94 counterclockwise (FIG. 7) to apply the brake. In such conditions, both brakes can be released manually by pulling on a cord 103 connecting the free ends of both levers 94. Both motors are furnished with disc brakes operable by a hand lever 104 (FIG. 9) and both may be turned manually by a crank handle 105 that can be fitted to the motor shaft.

Figures 10, 11, 15:
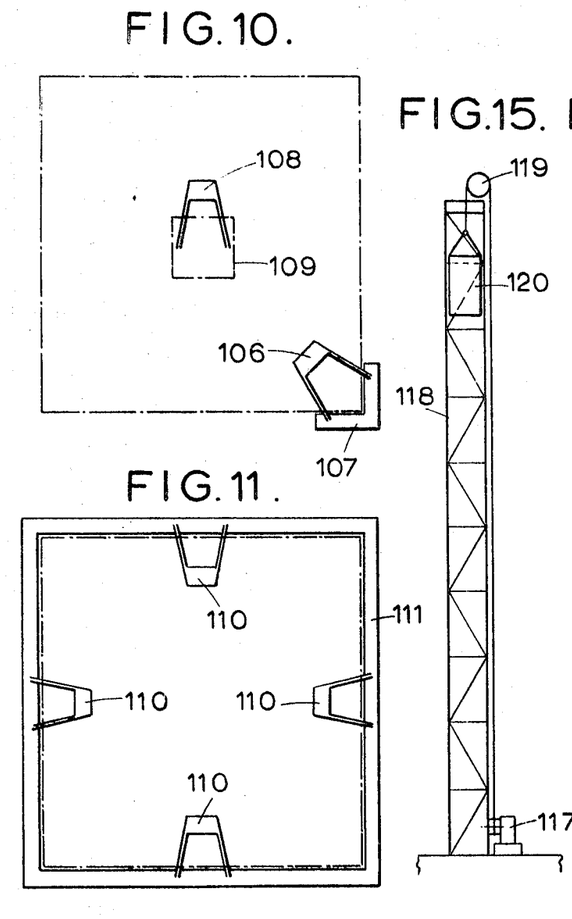

Some ways of using the portable hoists of the invention will now be described. In FIG. 10, a hoist 106 is placed at the corner of a building and arranged to lower and raise an angular platform or cage 107 having limbs parallel to two faces of the building. A hoist 108 is positioned to lower and raise a cage in a shaft 109 during the construction of the building, the shaft 109 being intended to serve as a lift-shaft in the finished building. FIG. 11 shows four portable hoists placed respectively above the four faces of a building, centrally of the faces, for the purpose of raising and lowering a rectangular platform 111 embracing the entire building.

Figure 12:
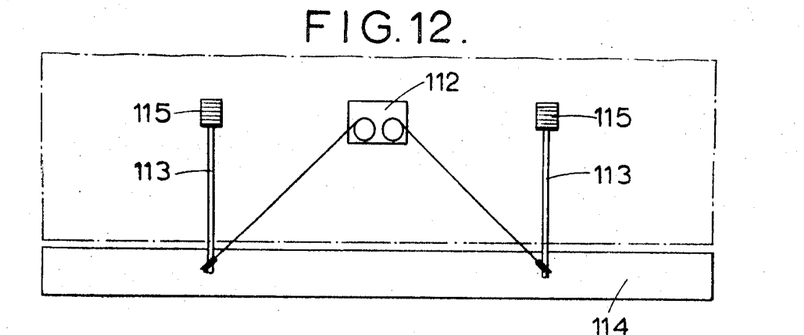

FIG. 12 shows a hoist 112 with the jibs removed and replaced by two bars 113 that project over the face of the building. The bars 113 carry sheaves 114 over which the cables from the hoist 112 pass to support a wide platform 114. Weights 115 are mounted on the inner ends of the bars 113 to prevent them from tipping over the edge of the building. FIG.

Figure 13:
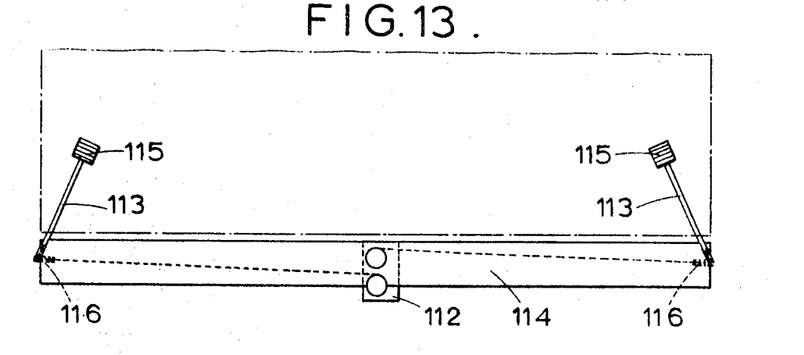
Figure 14:
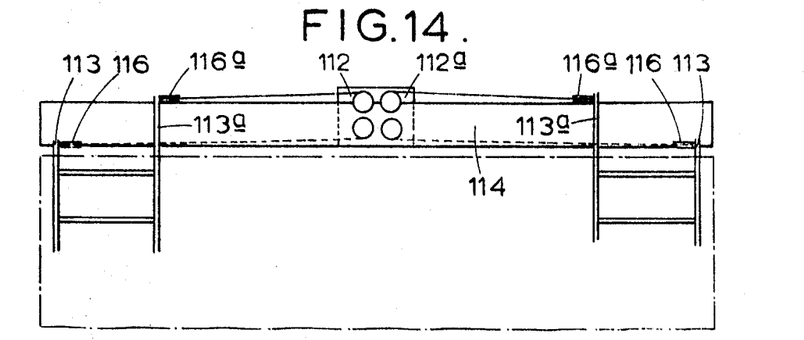

13 shows a modification of FIG. 12 in which the ends of the cables are fixed to the outer ends of the bars 113 and the hoist 112 is fixed to the underside of the platform 114. The cables pass round sheaves 116 at the ends of the platform 114 and upwards to the bars 113. FIG. 14 shows a further modification, in which two hoists 112, 112a are fixed beneath the platform 114 and the four cables pass to sheaves 116, 116a on the platform and thence upwards to bars 113, that project only a little way over the edge of the building, and to bars 113a that project further.

Figure 16:
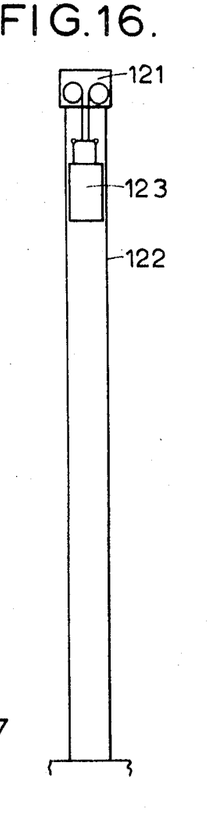

FIGS. 15 and 16 show two further ways of using the hoist with the jibs removed. FIG. 15 shows the hoist 117 at the bottom of a vertical framework 118. The two cables pass upwards to sheaves 119 at the top of the framework 118 over which they pass to support a cage 120 that they raise and lower inside the framework. In FIG. 16 a hoist 121 is mounted at the top of a shaft 122 with the cables arranged to support a cage 123, which is to be raised and lowered inside the shaft.

The portable weatherproof control box 45 weighs 45 lbs. and contains three basic circuits, that is a 415 volt, 50 cycle three phase circuit, a 240 volt DC circuit and a 50 volt single phase AC circuit. The first circuit supplies the power for the two motors, the second controls the brake circuit, and the third provides for the controlling functions.

The incoming supply is 415 volts and this passes through a main "on-off" switch which is mechanically interlocked to ensure that this supply is cut off when the box is opened. This supply is fed into a stepdown transformer and full-wave bridge rectifier to supply the brake solenoid by way of a contactor. The main supply is also fed by way of a main isolating contactor to "hoist" and "lower" contactor terminals. The 50 volt circuit is also supplied from the stepdown transformer and through a transformer which is variable to accommodate any variation in 50 volt supply.

The controller 44 has "hoist," "lower" and "on-off" pushbuttons. When the "on-off" button is closed the main isolating contactor in the control box 45 is closed to supply power for the "hoist" and "lower" contactors. The main isolating contactor is actuated by a solenoid in the 50 volt single phase circuit and the contactors for the reversing motors and for the brake-releasing solenoid are also controlled by solenoids in the 50 volt circuit. When the main isolating contactor has been closed and the "hoist" or the "lower" button is closed, the brakes are released and the motors begin to rotate in the appropriate direction. Safety devices, known in the art, are provided for guarding against earth leakage, overload, and erroneous sequencing of the functions of the device.

The disc brake on the motor 27, or on each motor 87, is controlled by a DC solenoid fed through a bridge rectifier mounted on the motor. The main supply to the motor is tapped at the motor to feed this solenoid. If the motor fails or is disconnected under the control of the devices in the control box 45, the disc brake is automatically applied to lock the motor, except when the hand lever 43 or 104 is actuated to release the brake.

I claim:

1. A portable hoist, comprising: a frame, two vertical parallel cable drum spindles rotatably mounted on said frame, a cable drum axially slidably and nonrotatably mounted on each said drum spindle for rotation therewith about the axis of its respective spindle, bearings rotatably supporting each spindle on the frame, each said bearing being located below its respective cable drum, two intermeshing gears nonrotatably mounted one on each of said spindles for rotation therewith, each of said intermeshing gears located beneath its respective cable drum, such that the spindles and hence the drums, are caused to rotate in opposite directions at the same speed, two electric motors mounted on the frame, one of said electric motors being drivingly engaged with each of said intermeshing gears for driving the cable drums, two brake mechanisms mounted one on each of said spindles for braking its respective spindle, and hence for braking the cable drum on that spindle, each of said brake mechanisms located beneath the cable drum on its respective spindle, electrical means for maintaining said brake mechanisms in their brake releasing positions, and means for manually applying both of said brake mechanisms simultaneously to hold their respective spindles against rotation, the portion of the spindles above the cable drums thus being substantially free of obstructions so that the cable drums can be removed upwardly off of their respective spindles without disturbing said gears, said bearings or said brakes, whereby portability of the hoist is provided by substantially reducing its overall weight by removing the wound cable drums from the frame without the necessity for significant dismantling of the hoist.

2. A portable hoist according to claim 1, including two detachable jibs removably connected to said frame, said jibs having sheaves mounted at their outer end over which the cables from said drums travel.

3. A portable hoist according to claim 2, wherein each said jib is formed in at least two sections divisible from each other and assembled end to end in the completed jib.

4. A portable hoist according to claim 2, including means for pivotably mounting each jib on the frame to enable the separation between the sheaves to be adjusted.

5. A portable hoist according to claim 1, including a portable electrical control box containing means for controlling said motors and said electrical brake-maintaining means and having a connection for connection to a source of electrical power, a connection to said motors, and a connection to a remote manually operable controller.

6. A portable hoist according to claim 1, wherein each brake mechanism includes caliper brake shoes arranged to be applied to brake drums under the action of springs and wherein said electrical means comprises electrical magnets.

7. A portable hoist according to claim 1, wherein at least one of the motors is furnished with a hand-operated brake on its shaft and includes means including a handle for turning its shaft manually.

8. A portable hoist according to claim 1, wherein the frame is divisible into two parts, each constituting a self-contained hoist or winch including one of the drums, one of the motors, one of the brake mechanisms and electrical and mechanical means for controlling the brake mechanisms.

9. A portable hoist according to claim 1, wherein, on each spindle, the said gear is located immediately beneath the cable drum, the brake mechanism is located immediately beneath the gear, and the bearing is located beneath the brake.

10. A portable hoist according to claim 1, including jibs connected to said frame and having sheaves mounted at their outer ends over which the cables from said drums travel, and wherein the jibs extend generally horizontally outwardly from the frame, wherein the frame, beneath the cable drum and the jibs can rest on a generally horizontal surface with the outer ends of the jibs projecting beyond the edge of such surface.